(12) United States Patent
Rowan, Jr. et al.

(10) Patent No.: US 7,717,395 B2
(45) Date of Patent: May 18, 2010

(54) ADJUSTABLE SUPPORT APPARATUS FOR MACHINERY

(75) Inventors: Robert L. Rowan, Jr., Houston, TX (US); Charles L. Rowan, Houston, TX (US)

(73) Assignee: Robert L. Rowan & Associates, Inc., Houston, TX (US)

( * ) Notice: Subject to any disclaimer, the term of this patent is extended or adjusted under 35 U.S.C. 154(b) by 554 days.

(21) Appl. No.: 11/162,422

(22) Filed: Sep. 9, 2005

(65) Prior Publication Data
US 2006/0054775 A1    Mar. 16, 2006

Related U.S. Application Data

(60) Provisional application No. 60/610,348, filed on Sep. 16, 2004.

(51) Int. Cl.
F16M 11/00 (2006.01)
(52) U.S. Cl. .................. 248/678; 248/188.2; 248/188.3; 248/649; 248/676; 248/679; 248/680
(58) Field of Classification Search .................. 248/678, 248/637, 644, 649, 674, 676, 677, 679, 680, 248/188.2, 188.3
See application file for complete search history.

(56) References Cited

U.S. PATENT DOCUMENTS

| | | | | |
|---|---|---|---|---|
| 1,402,998 | A * | 1/1922 | Anderson | 248/188.2 |
| 3,361,410 | A | 1/1968 | Messer | 254/101 |
| 4,798,359 | A * | 1/1989 | Ball | 248/188.3 |
| 5,016,338 | A | 5/1991 | Rowan | 29/423 |
| 5,080,319 | A * | 1/1992 | Nielsen | 248/669 |
| 5,110,082 | A * | 5/1992 | Rowan, Jr. | 248/678 |
| 5,163,775 | A | 11/1992 | Rowan | 403/301 |
| 5,176,465 | A * | 1/1993 | Holsted | 403/379.6 |
| 5,393,165 | A | 2/1995 | Rowan | 403/301 |
| 6,513,280 | B2 * | 2/2003 | Roberts | 43/109 |

OTHER PUBLICATIONS

Applicants Admited Prior Art (AAPA) as identified by Figure 2A-2B of the drawings, and pp. 14-15 of specification by Vibracon (TM) SM Element from Machine Support B.V., which the applicant submitted.*

(Continued)

*Primary Examiner*—J. Allen Shriver
*Assistant Examiner*—Todd M. Epps
(74) *Attorney, Agent, or Firm*—Wong, Cabello, Lutsch, Rutherford & Brucculeri, LLP

(57) ABSTRACT

An apparatus for supporting an axial load between first and second planes with an axial dimension therebetween includes first, second, and third members. The first member has a planar face on one end engaging the first plane and has a spherical face on the other end. The second member has a spiraling face on one end and has a spherical face on another end. The spherical face engaging the spherical face of the first member so that the first and second spherical faces maintain substantial contact for transferring the axial load between the first and second planes whether the planes are parallel or non-parallel. The third member has a spiraling face on one end and has a planar face on another end. The planar face engages the second plane. The spiraling face engages the spiraling face of the second member. The axial dimension of the second and third members can be adjusted when at least one is rotated.

23 Claims, 7 Drawing Sheets

OTHER PUBLICATIONS

"Rowan Tri-Brid(TM)," obtained from www.rirowan.com, copyright 1999, revised Sep. 2003, 4-pgs.

"Solve Alignment and Vibration Problems with Lock-Chock(TM)," obtained from www.rirowan.com, copyright 1999, revised Sep. 2003, 1-pg.

"Vibracon SM Elements by Machine Support," obtained from www.machinesupport.com/english/vibracon.html, generated on Sep. 9, 2005, 1-pg.

"Vibracon SM Elements Technical Data," obtained from www.machinesupport.com/english/vibracon_techdata.html, generated on Sep. 9, 2005, 2-pgs.

"Procedure for installing Vibracon(R) SM elements," obtained from www.machinesupport.com/english/vibracon_instructions.html, generated on Sep. 9, 2005, 2-pgs.

"Vibracon SM Elements News," obtained from www.machinesupport.com/english/vibracon_low.html, generated on Sep. 9, 2005, 4-pgs.

De Vlaam, Geoffrey, "Providing a good foundation for machines," Technology, obtained from www.machinesupport.com, dated Feb. 2004, pp. 21-24.

Vibracon(R) SM Brochure, obtained from www.machinesupport.com, dated Feb. 2005, 4-pgs.

"Vibracon(R) Installation Procedure," obtained from www.machinesupport.com, dated Apr. 2005, 2-pgs.

"Vibracon(R) Application Design Instructions," obtained from www.machinesupport.com, dated Apr. 2005, 2-pgs.

International Search Report & Written Opinion of PCT/US2005/32280, dated Jul. 14, 2008.

* cited by examiner

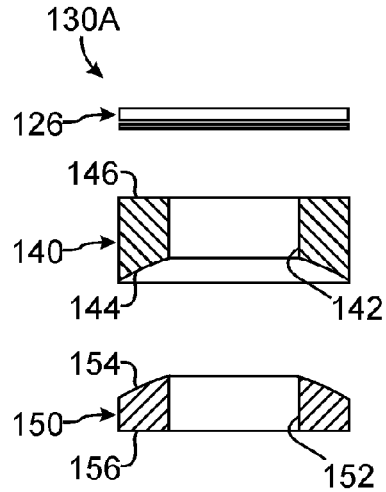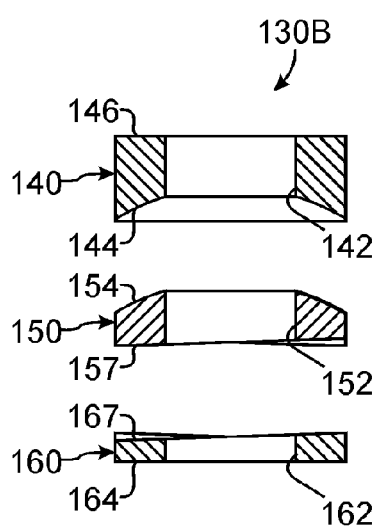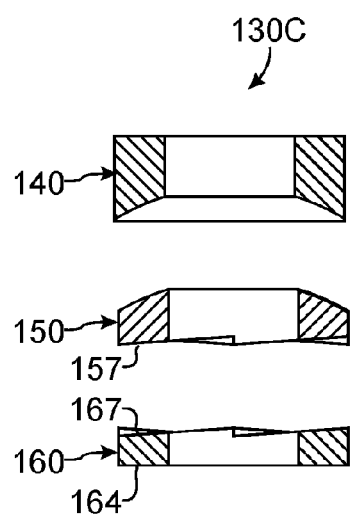
FIG. 4　　　　FIG. 5　　　　FIG. 6
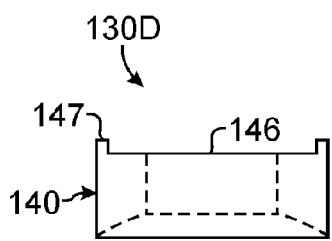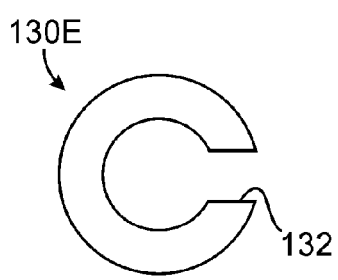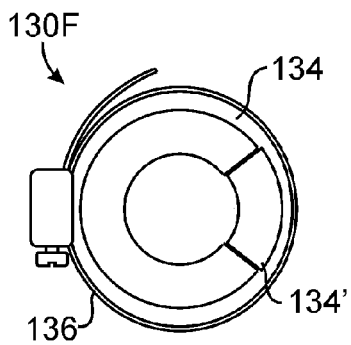
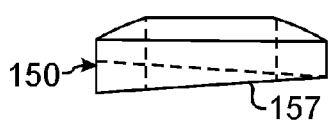
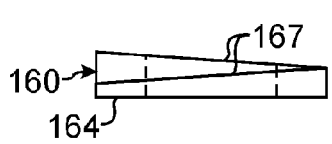

FIG. 7　　　　FIG. 8　　　　FIG. 9

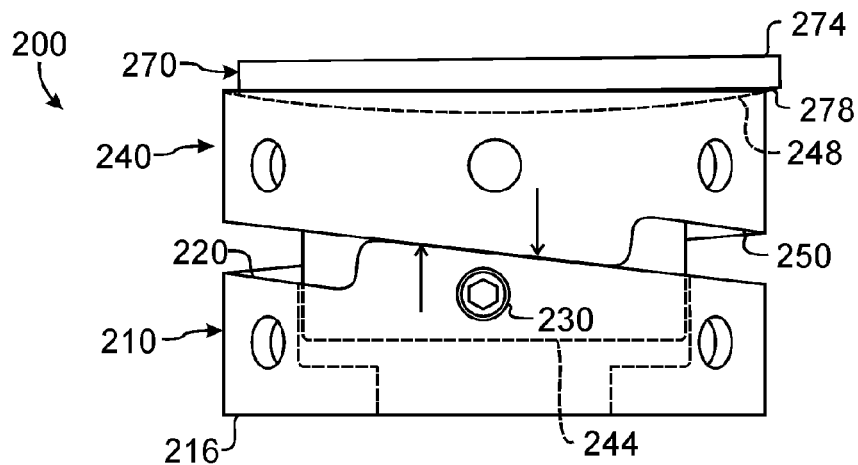
FIG. 15
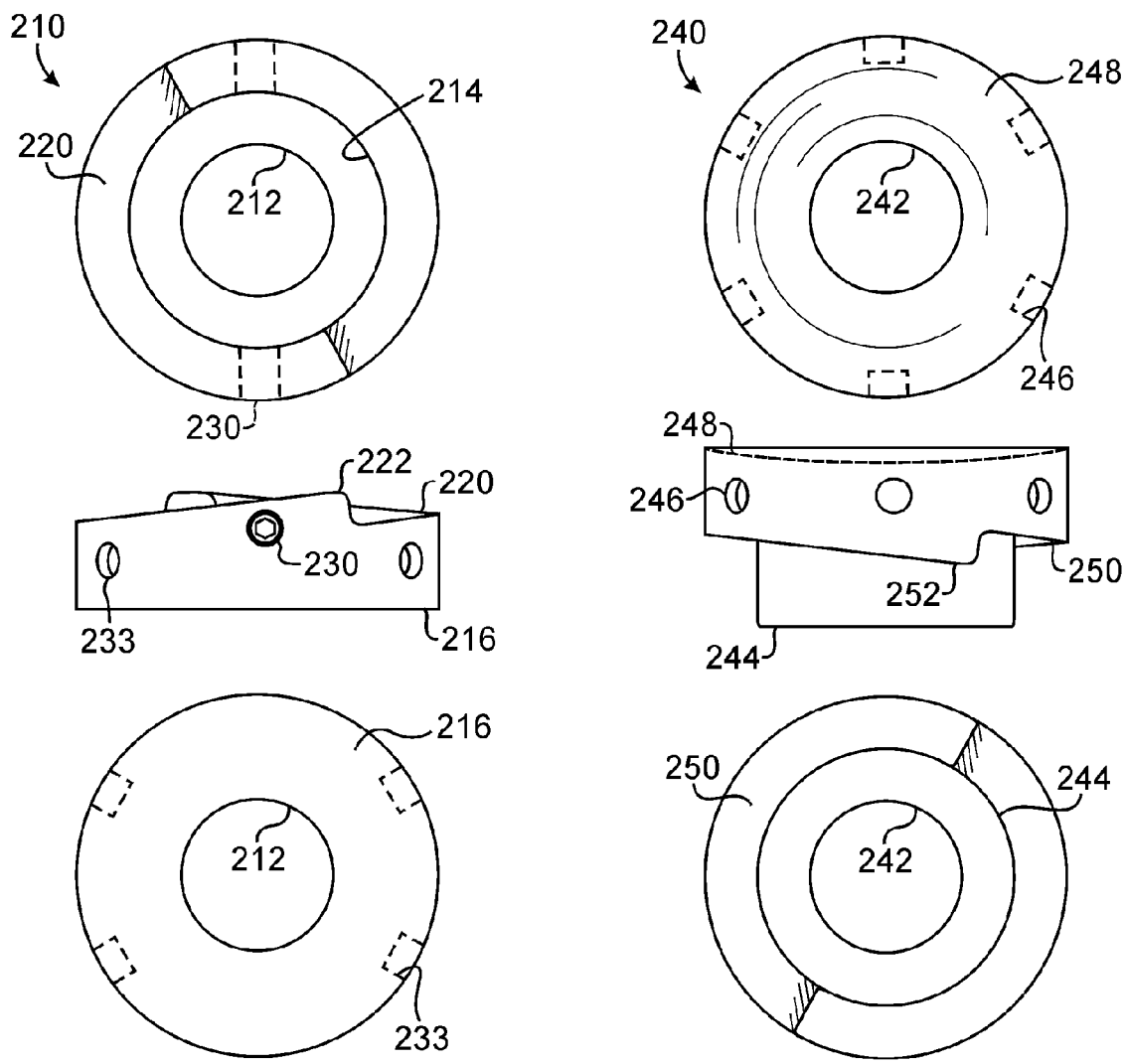
FIG. 16  FIG. 17

ADJUSTABLE SUPPORT APPARATUS FOR MACHINERY

CROSS-REFERENCE TO RELATED APPLICATION

This application claims the benefit of U.S. Provisional Application Ser. No. 60/610,348, filed Sep. 16, 2004, which is incorporated herein by reference.

FIELD OF THE DISCLOSURE

The subject matter of the present disclosure generally relates to a support for machinery and more particularly relates to an adjustable support apparatus for machinery that provides both support and vertical alignment capability with or without an associated anchor bolt.

BACKGROUND OF THE DISCLOSURE

Various types of machinery support systems have been around for years. Examples of some of prior art machinery support systems include U.S. Pat. No. 5,110,082 "Adjustable Apparatus for Supporting Machinery or Other Load" and U.S. Pat. No. 5,016,338 "Method for Adjusting the Vertical Position of a Frame on a Foundation."

FIG. 1A shows the frame 12 of a machine 10 anchored to and supported by a foundation 14, which is typically constructed from concrete or steel. Anchoring is done by anchor bolts 22. The frame 12 may initially rest on jacking bolts 24 or on hydraulic jacks. Of course, the goal in anchoring the frame 12 is ultimately to have the weight of the machine 10 borne directly by the foundation 14, if the foundation is steel, or intermediately by grout which is poured above and onto the foundation 14, as is typically seen with concrete foundations. In this prior art system for supporting the machine 10, a base chock 26 rests on placement bolts 28, which in turn rest on or are anchored to the foundation 14. For stability purposes, the base chock 26 may include suitable threaded openings to receive the placement bolts 28.

One type of prior art support system is a tapered wedge support 30, such as shown in FIG. 1B. The tapered wedge support 30 uses a flat surface to support the machine (not shown), which may or may not match the same exact plane as the base (not shown) of the machine or equipment support. Matching the plane can be important to properly support the machine and provide good vertical and horizontal restraint for the machine base being supported. One example of a commercially available tapered wedge support is the Rowan Lock Chock™ from Robt. L. Rowan & Associates, Inc.

Another type of prior art support system is a screw jack support 50, such as shown in FIGS. 2A-2B. The screw jack support 50 has threaded portions 52 and 54 and a top portion 56. The threaded portions 52 and 54 thread together and provide vertical adjustment. Threaded portion 54 and the top portion 56 have convex/concave spherical surfaces to compensate for the foundation and the machine base being out-of-plane. The screw jack support 50 is similar to a double spherical washer, which is often used under the top nut of a machine anchor bolt to compensate for any difference between the machine boss of the equipment base and the plane of the bottom of a typical hex anchor bolt nut. The main problem with the screw jack support 50 is that the load capacity is limited by the shear strength of the screw threads 55 that provide the vertical alignment for the support 50. Consequently, screw jack supports 50 have large diameters to provide enough cross-sectional area at the base of the threads to resist the weight of the machine being supported, the preload from the anchor bolt, and the shaking forces from operating the machine or from other external forces, such as wind loads and seismic loads. One example of a commercially available screw jack support is the Vibracon™ SM Element from Machine Support B. V.

The subject matter of the present disclosure is directed to overcoming, or at least reducing the effects of, one or more of the problems set forth above.

SUMMARY OF THE DISCLOSURE

With regard to the above-described problems of the prior art, an adjustable support system according to certain teachings of the present disclosure has spiraling faces for axial adjustment and has convex/concave spherical faces for planer adjustability.

As described below, the support system has members that support an axial load between first and second planes. The members can support this axial load because the axial load transfers through the members and acts as compressive forces between the contacting faces of the members.

In one embodiment of the present disclosure, an apparatus for supporting an axial load between first and second planes with an axial dimension therebetween includes first, second, and third members. The first member has one end for bearing the load of the first plane. This end of the first member can have a planar face for engaging the first plane. The first member also has a spherical face on another end for providing planar adjustability between the planes.

The second member has a spiraling face on one end and has a spherical face on another end. The spherical faces of the first and second members engage with one another to maintain substantial contact for transferring the axial load between the first and second planes whether the planes are parallel or non-parallel.

The third member has one end for bearing the axial load with the second plane, and this end can have a planar face that engages the second plane. The third member also has a spiraling face on another end. The spiraling face engages the spiraling face of the second member. The axial dimension of the second and third members can be adjusted when the members are rotated relative to one another.

In a further embodiment, the one opposite end of the third member bearing the axial load of the second plane can have a spherical face. The apparatus can include a fourth member positioning between the first and second planes and having opposite ends. One of the ends bears the axial load of the second plane, and the other end has a spherical face positioning against the spherical face on one of the end of the third member.

In a further embodiment, the apparatus can include a lock engaged between the second and third members for maintaining the rotational alignment between the members. In one example, the lock can include a plurality of serrations formed on the spiraling faces of the second and third members. In another example, the lock can include a cap screw threaded transversely through one of the members and having a distal end engaging the other member to maintain the rotational alignment between the members. In yet another example, the lock can include a dowel pin or cap screw positioned axially through one of the members and having a distal end positioning axially through a portion of the other member to maintain the rotational alignment between the members.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which:

FIG. 4 illustrates a cross-sectional view of the lateral adjustable support of FIGS. 3A-3B.

FIG. 5 illustrates a cross-sectional view of an embodiment of a laterally adjustable support that is also capable of axial adjustment.

FIG. 6 illustrates a cross-sectional view of another embodiment of a laterally adjustable support that is also capable of axial adjustment.

FIG. 7 illustrates a cross-sectional view of yet another embodiment of a laterally adjustable support that is also capable of axial adjustment.

FIG. 8 illustrates an embodiment of an adjustable support for retrofitting.

FIG. 9 illustrates another embodiment of an adjustable support for retrofitting.

FIG. 15 illustrates an elevational view of an embodiment of a support capable of lateral and axial adjustment.

FIG. 16 illustrates various views of a first component of the support of FIG. 15.

FIG. 17 illustrates various views of a second component of the support of FIG. 15.

Figure 1A:
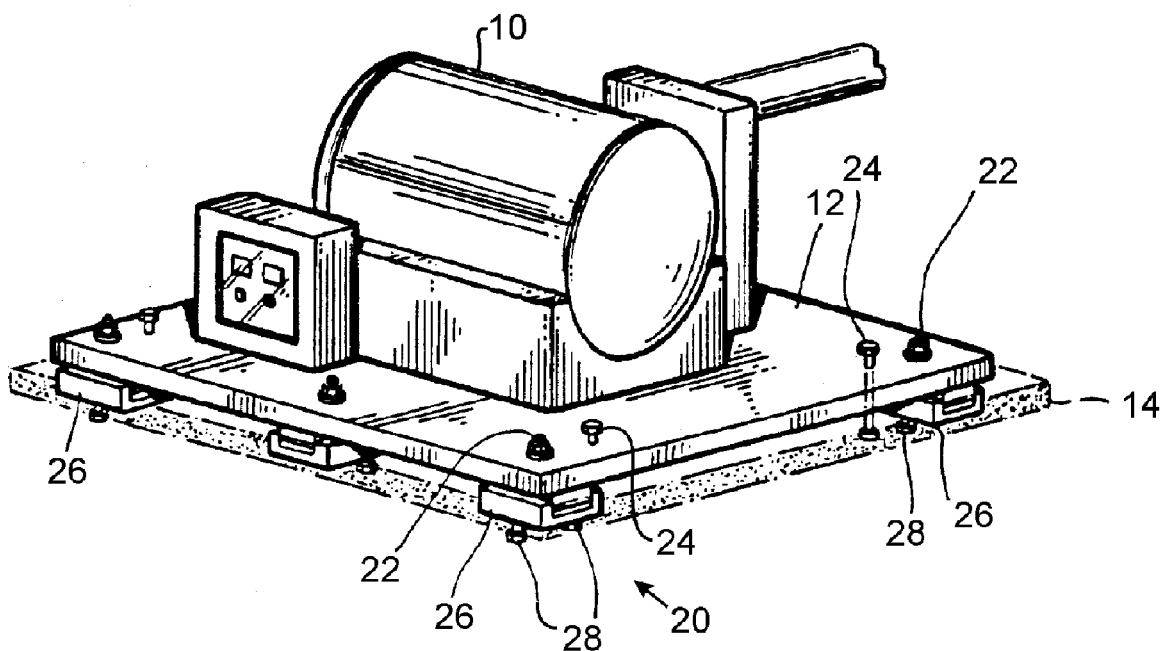
FIG. 1A illustrates a perspective view of a machine anchored to a foundation with a prior art support system.
Figure 1B:
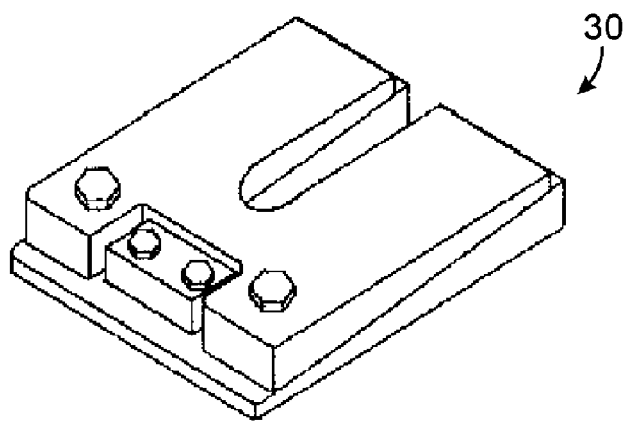
FIG. 1B illustrates a tapered wedge support according to the prior art.

While the disclosed support apparatus is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. § 112.

DETAILED DESCRIPTION

Figure 3A:
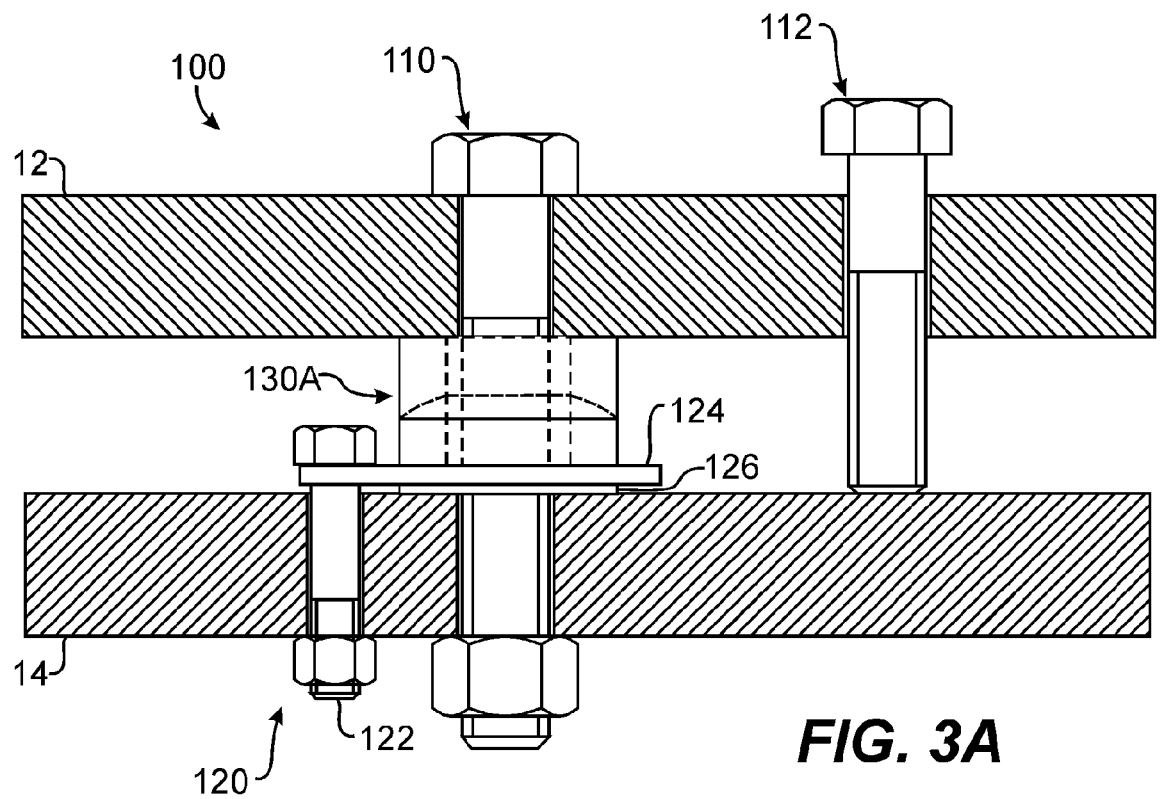
FIGS. 3A-3B illustrate a first embodiment of a support according to certain teachings of the present disclosure for lateral adjustment between a motor foot or rail and a skid.
Figure 3B:
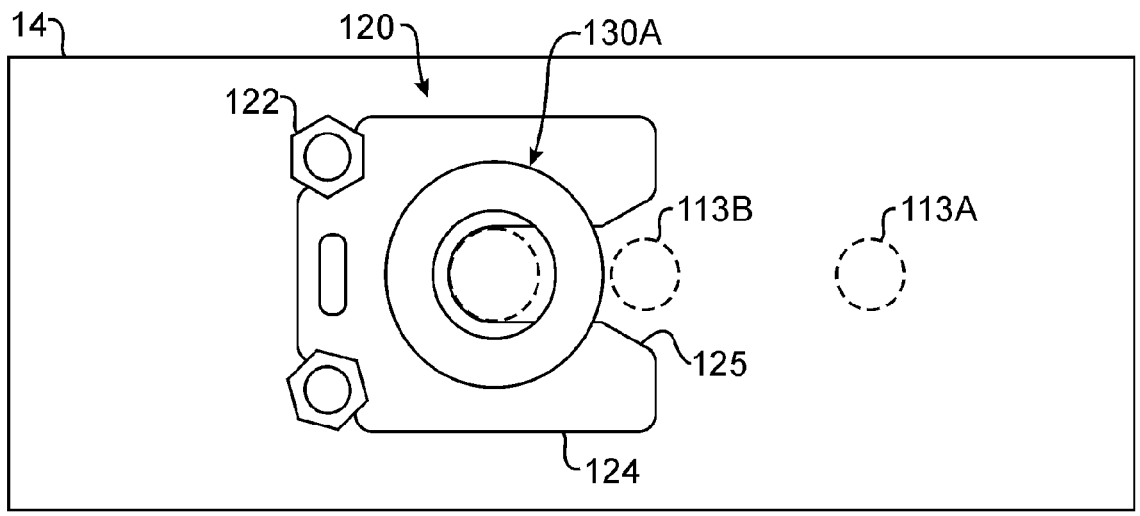

Referring to FIGS. 3A-3B, a laterally adjustable support system 100 is shown positioned between a motor foot 12 and a machinery skid 14. FIG. 3A shows a side view in partial cross-section, while FIG. 3B shows a top view without the motor foot present. To hold the foot 12 to the skid 14, a hold down or anchor bolt 110 passes through the foot 12, a laterally adjustable support 130A, and the skid 14. A jack screw 112 is threaded through the foot 12 and its distal end contacts the skid 14. Rotation of the jack screw 112 allows the orientation of the foot 12 to be adjusted relative to the skid 14. Several of these arrangements of hold down bolts 110, supports 130A, and jack screws 112 are used on a motor, and the jack screws 112 can be adjusted to level the motor. Conversely, any equipment being driven by a motor or any prime mover, such as a pump or compressor, can be similarly supported. Other potential applications for the support 130A include diesel engine generator sets and marine drive systems.

In the present embodiment and if needed, a shim system 120 is used with the support 130A to achieve vertical alignment adjustment by increasing the dimension between the foot 12 and the skid 14. The shim system 120 includes bolts 122 bolted through the skid 14 that hold a shim holder 124 in place. The support 130 is positioned between the shim holder 124 and the foot 12. The shim holder 124 acts as a shim, and one or more shims 26 can be positioned between the shim holder 124 and the skid 14 to increase the distance between the foot 12 and skid 14 if needed.

The support 130A has two members. Each member has opposite ends. Mating spherical faces on stacked ends of the two members allow the support 130A to fit between parallel or non-parallel planes (e.g., foot 12 and skid 14) and make the support 130A laterally adjustable as needed. The spherical faces maintain substantial contact so that the support provides load capacity between the foot 12 and skid 14. The support 130A along with the other embodiments of supports disclosed herein can be constructed from steel, cast iron, or other metallic materials. In addition, the disclosed supports can be constructed from plastic or composite materials, which can offer heat insulation or vibration damping. The current state of the art includes heat insulation in flat plane and tapered machine support devices. It is believed that machine supports of the prior art do not incorporate composite materials to reduce machinery vibration.

The location of the distal end of the jack screw can differ depending on the implementation. As shown in FIG. 3B, a first location 113A for the jack screw is shown spaced from the anchor bolt 110 by about 5-inches, for example. This first location 113A is typical for an implementation having a foot of a motor. As also shown in FIG. 3B, a second location 113B for the jack screw is shown spaced from the anchor bolt 110 by about 2-inches, for example. This second location 113B is typical for an implementation having a rail of large internal combustion gas engine, such as a Waukesha gas engine. In this implementation, the jack screw 112 is positioned close to the hold down bolt 110 so that the shim holder 124 preferably has a slot 125 defined in one end to accommodate the distal end of the jack screw in this close location 113B. In this implementation, use of the shim system may be undesirable, and supports with spiraling faces, which are discussed below, may be preferred to provide equivalent support capacity and to fit in place without interfering with jack screws.

Referring to FIG. 4, the embodiment of the laterally adjustable support 130A of FIG. 3A-3B is shown in a cross-sectional view. The support 130A can be composed of metal, a composite plastic, an epoxy composite material, or combination of these. The support 130A includes a first annular member 140 and a second annular member 150. If the support 130A is to be used with a hold down bolt, both members 140 and 150 include central bores 142 and 152 for a hold down or anchor bolt (not shown) to pass through. Otherwise, the central bores 142 and 152 may not be required. The first member 140 has opposite ends with a concave bottom face 144 and a substantially planar top face 146. In contrast, the second member 150 has opposite ends with a convex top face 154 and a substantially planar bottom face 156. Of course, the members 140 and 150 can be inverted in arrangement so that the use of upper, top, bottom, under, and the like is merely for convenience.

Figure 2A:
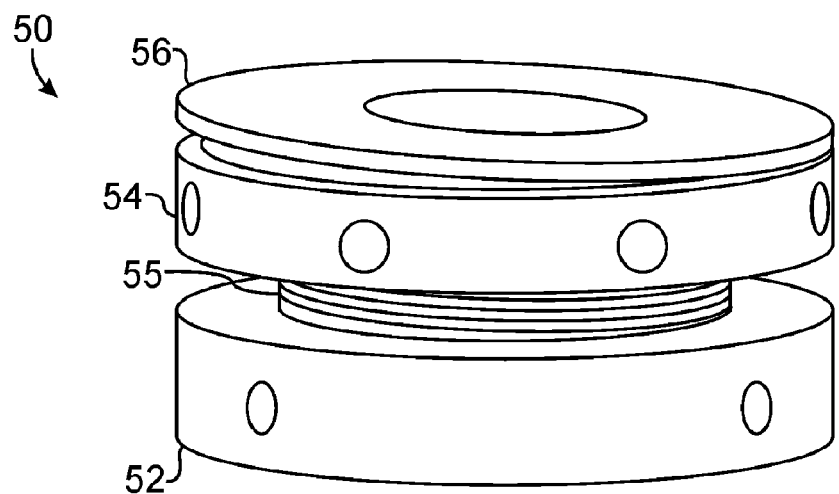
FIGS. 2A-2B illustrate views of a screw jack support according to the prior art.
Figure 2B:
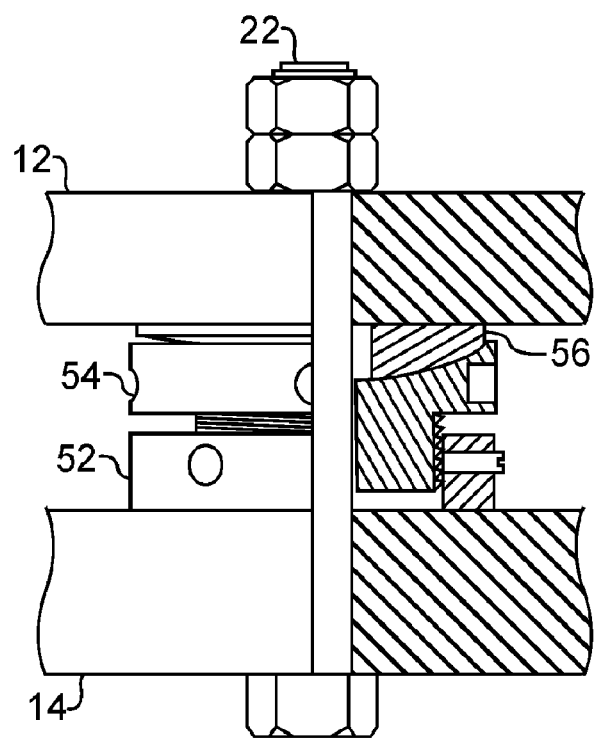

The planar faces 142 and 152 are substantially perpendicular to the central axis of the members 140 and 150, respectively. In the present embodiment, the convex and concave faces 144 and 154 are substantially spherical and complimentary. When the members 140 and 150 are stacked together, these spherical faces 144 and 154 fit together and allow the orientation between the members 140 and 150 to be adjusted. Thus, the first and second faces 144 and 154 maintain substantial contact for transferring the axial load between the planar faces 142 and 152 whether the planes are parallel or non-parallel. In this way, the orientation between the planar faces 146 and 156 can fit the orientation of the foot (10, FIG. 2A) and skid (12, FIG. 2A), which may or may not be parallel. Thus, the faces 144 and 154 maintain substantial contact for providing support between the foot and skid regardless of the orientation of the foot and skid. Shims 126 cam be used to adjust the vertical alignment between one of the members 140 or 150 and the foot or skid as needed. In an alternative embodiment, however, the faces 144 and 154 need not be spherical.

Referring to FIG. 5, another embodiment of a laterally adjustable support is illustrated in cross-section. In contrast to the previous embodiment, the present embodiment of the support 130B is also capable of axial adjustment in addition to lateral adjustment. The support 130B having annular members 140, 150, and 160 with central openings 142, 152, and 162, respectively. The first and second members 140 and 150 are substantially similar to those discussed above in FIG. 4. However, the second member 150 does not have a bottom, planar face perpendicular to the central axis of the member 150. Instead, the second member 150 has an inclined circular plane or spiraling face 157 that spirals around the central axis of the member 150. The face 157 spirals such that a start of the spiral is lower than an end of the spiral along the central axis.

In one embodiment, the plane of the face 157 can be perpendicular to the central axis. Alternatively, the plane of the face 157 can be canted inwards or outwards relative the vertical centerline or central axis of the member 150. The inward or outward canter of the face 157 would allow for "centering" of the member 150 with the third member 160 stacked below. The inclined circular plane or spiraling face 157 can be made in one complete circumferential step or can have a series of steps such as two steps (at 0° and 180°), or 4 steps, etc.

The third member 160 fits under the second member 150. This third member 160 includes a spiraling face 167 and a planar face 164. The spiraling face 167 is complimentary to the spiraling face 157 of the second member 150. The planar face 164 is substantially perpendicular to the central axis of the member 160. Thus, rotation of the second member 150 or third member 160 relative to the other when stacked on top of each other will increase the overall dimension of the members 150 and 160 along the central axis. In this way, the members 150 and 160 can provide axial adjustment without the need for shims and the like. Also, as noted previously, the convex and concave faces 144 and 154 between the first and second members 140 and 150 provided lateral or horizontal adjustment. The support 130B provides a circular plane for axial adjustment without the limitation of a small cross-sectional area at the root of a thread form.

Holes (not shown) can be drilled in the side of the third member 160 so that it can be rotated for axial adjustment. When the member 160 is stacked under the second member 150, a tool can be fit into one or more of the holes to rotate the member 160 relative to the second member 150, which can also have holes for a tool to hold it in place. When rotated, the complementary spiraling faces 157 and 167 will increase or decrease the axial adjustment of the support.

Exemplary dimensions of the members 140, 150, and 160 are now discussed. The members 140, 150, and 160 can define diameters of 2.625-inches, and the convex and concave faces 144 and 154 can define a radius of 3.00-inches. Various angles of the spiraling faces 157 and 167 allow for different amounts of axial or vertical adjustment that can be achieved by rotating the second and third members 150 and 160 relative to one another. For example, the members 150 and 160 may have a diameter of 2.875-inches for a circumference of 9.0321-inches. If the angle of the spiral is 0.6343 degrees, then a full rotation of the members 150 and 160 will result in a 0.100-inch axial change. If the circumference of the members 150 and 160 is 9.0321-inches and the angle of the spiral faces 157 and 167 is 1.2685-degrees, then the vertical adjustment possible with the support 130B would be from 0 to about 0.200-inches. In another example, if the angle of the spiral is 2.5358-degrees, then a half rotation of 4.5161-inches around the 9.0321-inch circumference will produce a 0.200-inch change in axial direction. Various other diameters and angular orientations are possible to achieve various amounts of axial adjustment.

Referring to FIG. 6, another embodiment of a support 130C is illustrated in cross-sectional view. This support 130C includes first, second, and third members 140, 150, and 160 that are similar to those discussed above. However, the members 150 and 160 have spiraling faces 158 and 168 that are split into two parts (e.g., stepped), as opposed to the single spiraling faces of the embodiment of FIG. 5. If the circumference of the members 150 and 160 is 9.0321-inches and the angle of the steps of the spiral faces 158 and 168 is 2.5357-degrees, then the vertical adjustment possible with the support 130B would be from 0 to about 0.200-inches.

Referring to FIG. 7, another embodiment of a support 130D having annular members 140, 150, and 160 is illustrated in an elevational view. The support 130D is substantially similar to that discussed above in FIG. 5. However, the first member 140 includes ridges 147 used to engage a portion of the foot or other device and to keep the member 140 from rotating.

Referring to FIGS. 8 and 9, embodiments of adjustable supports 130E and 130F for retrofitting are illustrated. These adjustable supports 130E and 130F can be used to retrofit or replace an existing machinery support. In FIG. 8, each component 140, 150, and 160 of one embodiment of the adjustable support 130E defines a slot 132. In this slotted support 130E, the components 140, 150, and 160 can be slid around an existing anchor bolt without needing to lift the machine. After fitting the existing anchor bolt through the slots 132, the support 130E could be adjusted as disclosed herein.

In an alternative embodiment of FIG. 9, each component 140, 150, and 160 of the support 130F can have divided portions 134 and 134'. In this support 130F, the divided portions 134 and 134' of the components 140, 150, and 160 can be placed around an existing anchor bolt without needing to lift the machine. After placing around the existing anchor bolt, the divided portions 134 and 134' can be adjusted as disclosed herein and can be secured around the anchor bolt. A screw type or other type of clamp 136 could be used to secure the divided portions 134 and 134' of the split support 130F around the anchor bolt. The clamp 136 would have sufficient strength for the support 130F to work the same as an integral support, such as used in FIG. 8, for example.

Figure 10:
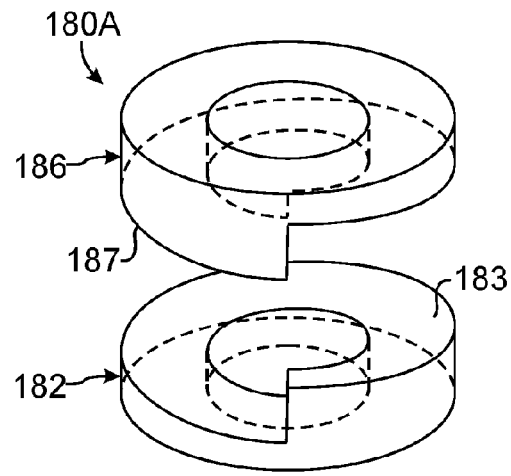
FIG. 10 illustrates an embodiment of an adjustable support for axial adjustment having a single step in a spiraling surface.
Figure 11:
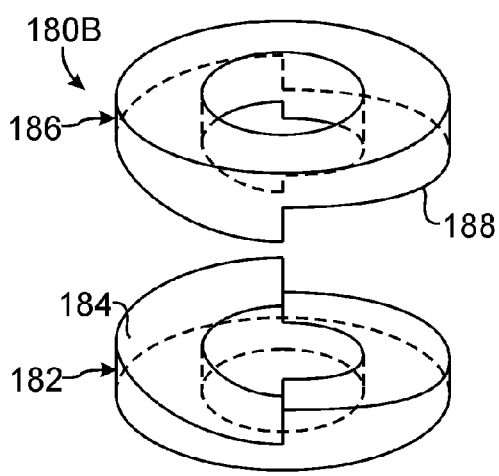
FIG. 11 illustrates an embodiment of an adjustable support for axial adjustment having multiple steps in a spiraling surface.

Although embodiments of supports disclosed herein have been discussed for axial adjustment as well as lateral adjustment between the foot and skid of a motor, the disclosed supports can also be used as part of a device for only axial adjustment. Referring to FIGS. 10 and 11, two supports 180A and 180B are shown. One support 180A has first and second portions 182 and 186 with circular inclined planes or spiraling faces 183 and 187 therebetween having one step. The other support 180B has first and second portions 182 and 186 with circular inclined planes or spiraling faces 184 and 188 therebetween having multiple steps. The disclosed supports 180A and 180B can have ends for bearing the axial load between a machine and a foundation or the like. For example, the ends can be planar faces, such as shown in FIGS. 10 and 11. Of course, these supports 180A and 180B can also be combined with one or more spherical faces to correct for non-parallelism between the machine base and its' foundation or matching support structure.

When spiraling faces are used between stacked members to provide axial adjustment in the supports disclosed herein, it is understood that axial pressure on the members would cause the members to rotate relative to one another, thereby decreasing any axial adjustment. Thus, the disclosed supports preferably incorporate technique of locking the inclined faces in such a way that they cannot move one relative to the other once set at the correct axial alignment. Several techniques for limiting or locking the stacked members relative to one another can be used, which are discussed below.

Figure 12A:
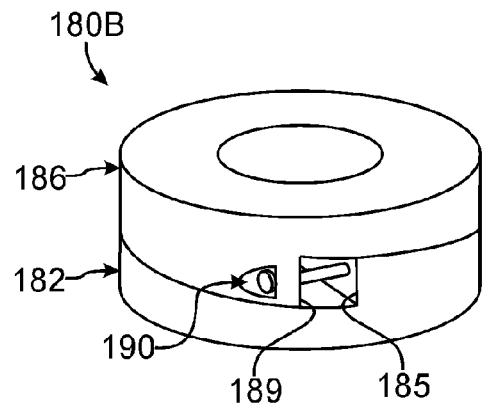
FIGS. 12A-12B illustrate a technique for locking stacked members of an axially adjustable support relative to one another.
Figure 12B:
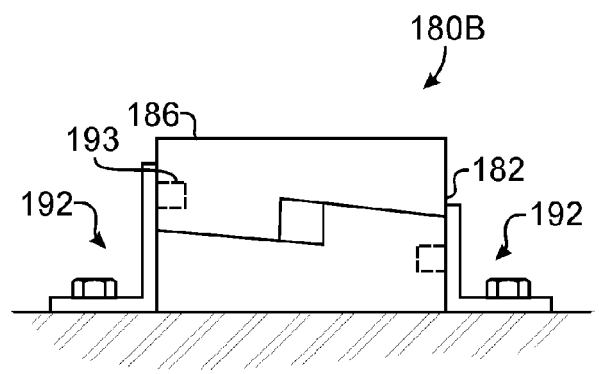

Referring to FIGS. 12A-12B, techniques are illustrated for limiting and/or preventing rotation of stacked members 182 and 186 relative to one another. In FIG. 12A, a cap screw 190 or other fastener can be threaded through one member 186 at one end or ledge 189 of the inclined plane or spiral 188. The distal end of the cap screw 190 can engage the ledge 185 of the inclined plane or spiral 184 of the other member 182. Thus, the screw 190 can maintain the separation between ledges 185 and 189, thereby limit the amount of rotation possible between the members 182 and 186. Instead of simply engaging the ledge 185, however, the distal end of the cap screw 190 in another embodiment can thread into a threaded opening in the ledge 185 so that the cap screw 190 can also prevent the members 182 and 186 from rotating relative to one another to maintain the axial adjustment therebetween.

In another technique shown in FIG. 12B, holes 193 can be provided in the sides of one or both of the members 182 and 186. One or more separate fixtures 192 can be attached to the motor foot or skid 14 and engage the holes 193 to maintain the position of the members 182 and 186 after axial adjustment.

Figure 13:
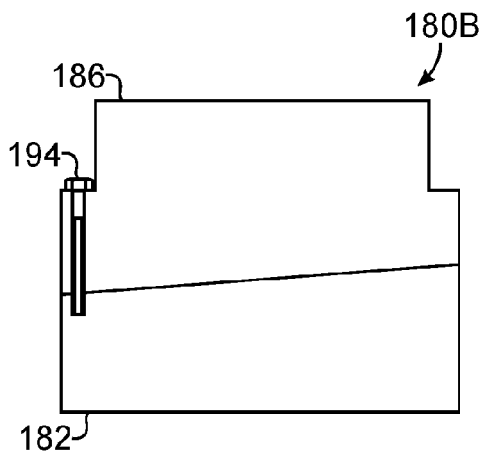
FIG. 13 illustrate techniques for locking stacked members of an axially adjustable support relative to one another.
Figure 14:
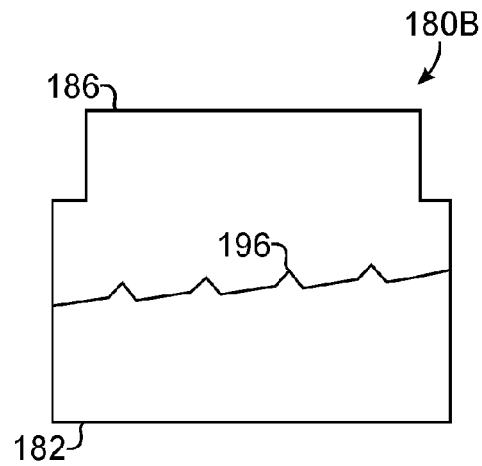
FIG. 14 illustrates additional technique for locking stacked members of an axially adjustable support relative to one another.

Referring to FIGS. 13 and 14, techniques are illustrated for locking stacked members 182 and 186 of an axially adjustable support 180C relative to one another. In FIG. 13, one or more vertical cap screws or dowel pins 194 can fit vertically through aligned holes in both members 182 and 186 to prevent rotation of the members 182 and 186. In FIG. 14, the inclined planes or spiraling faces of the members 182 and 186 can have serrations 198 such that the faces mate and lock the members 182 and 186 when forced together.

Referring to FIG. 15, an embodiment of a support 200 capable of lateral and axial adjustment is illustrated in an elevational view. The support 200 includes a first or bottom member 210, a second or upper member 240, and a third or top member 270, which fit together to form the support 200. Again, the support 200 can be composed of a suitable material and can be used in an inverted from what is shown in FIG. 15.

The bottom member 210 has opposite ends with a planar bottom face 216 and a spiraling upper face 220. The planar face 216 bears the load of a first plane and can be stacked against a foundation, skid, or the like. FIG. 16 illustrates various views of the bottom member 210. The bottom member 210 defines an axial bore 212 for positioning a bolt or the like through the member 210. The member 210 also has an internal bore 214 around which the spiraling face 220 extends. The spiraling face 220 is stepped in the present embodiment and has two ledges 222. A locking fastener 230, such as a locking nut or setscrew, is threaded into the side of the bottom member 210 and is used to engage a central portion 244 of the second member 240, as discussed below, to prevent rotation of the members 210 and 240 relative to one another after axial adjustment. The bottom member 210 also defines partial holes 233 in the side to receive a tool to rotate the member 210 when making axial adjustments.

The upper member 240 has opposite ends with a concave top face 248 and a spiraling bottom face 250. FIG. 17 illustrates various views of the upper member 240. The upper member 240 defines an axial bore 242 therethrough and has the central portion 244 that extends beyond the spiraling face 250. The spiraling face 250 is stepped in the present embodiment and has two ledges 252. The spiraling face 250 stacks against the other spiraling face 220 of the bottom member 210 so that rotation of the members 210 and 240 relative to one another allows for axial adjustment. As noted previously, the locking fastener 230 on the bottom member 210 can engage the central portion 244 of the upper member 240 to prevent rotation of the members 210 and 240. The upper member 210 also defines partial holes 233 in the side to receive a tool to rotate the member 210 when making axial adjustments. The top member 270 also defines a central bore 272 therethrough and has opposite ends with a planar face 274 and a convex face 278. The planar face 274 bears the axial load of a plane and can stack against a foundation, skid, or the like. The convex face 278 stacks against the concave face 248 and allows for lateral adjustment.

As noted above, the bottom member 210 and upper member 250 can be rotated relative to one another to adjust the axial dimension of the support 200. It is possible that the two members 210 and 240 can be rotated relative to one another to such an extent that the contact area of the spiraling faces 220 and 250 is insufficient to provide appropriate support. Therefore, rotation of the members 210 and 240 is preferably limited to some maximum amount, which depends on the size of the members, the desired load, etc. In one embodiment, the sides of the members 210 and 240 can include indicators, such as arrows, which when aligned show the maximum amount of relative rotation for the members 210 and 240. Other than the indicators, the support 200 can also include mechanisms that can limit the amount of relative rotation of the members 210 and 240.

Figure 18:
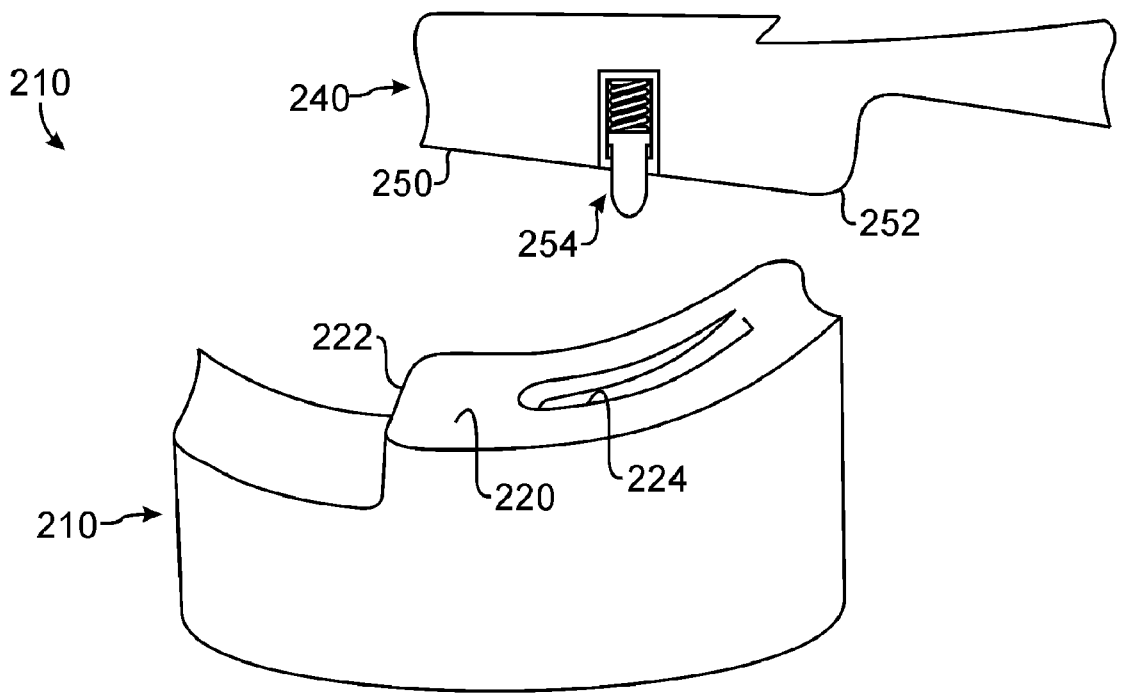
FIG. 18 illustrates an embodiment of a device for limiting axial adjustment of the support of FIG. 15.

Referring to FIG. 18, an embodiment of a mechanism for limiting axial adjustment of the support of FIG. 15 is illustrated. A portion of the bottom member 210 is shown having a groove 224 defined in the spiraling face 220 near the ledge 222. A portion of the upper member 240 is also shown with a spring-loaded pin 254 positioned in the spiraling face 220 near the ledge 222. When the spiraling faces 220 and 250 are engaged, the spring-loaded pin 254 is capable of engaging the groove 224 to prevent rotation of the members 210 and 240 relative to one another beyond a desired limit.

Figure 19:
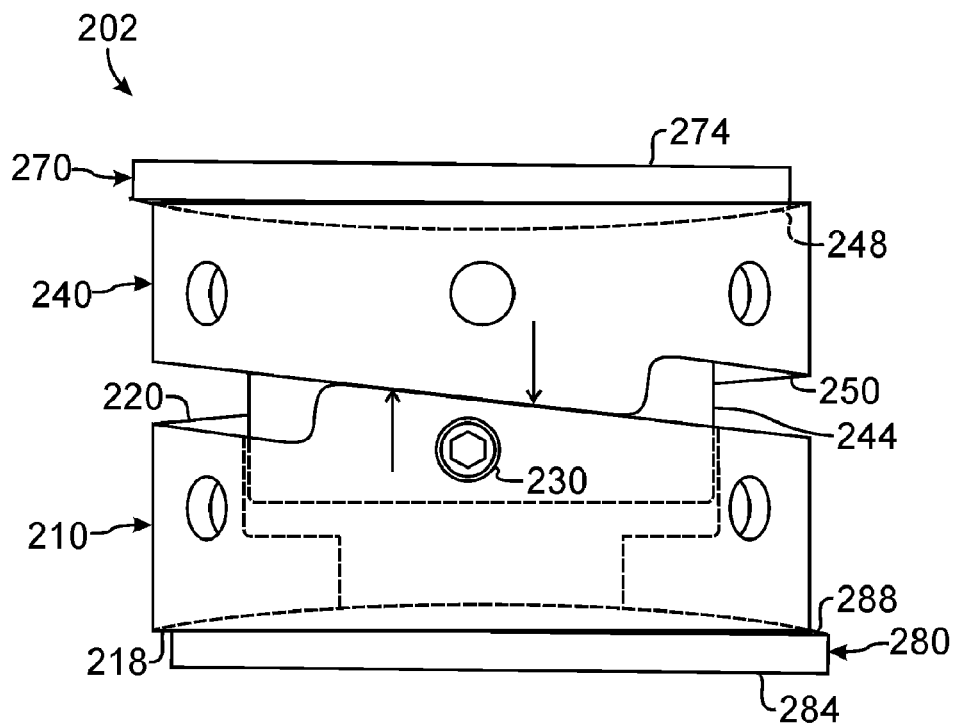
FIG. 19 illustrates an elevational view of another embodiment of a support capable of lateral and axial adjustment.

Referring to FIG. 19, another embodiment of a support 202 capable of lateral and axial adjustment is illustrated in an elevational view. The support 202 is substantially similar to that disclosed above with reference to FIG. 15 so that like reference numerals are used for similar components. However, the support 202 of FIG. 19 includes a fourth member 280 that stacks below the bottom member 240. The fourth member 280 resembles in top member in that it has an internal opening 282, a planar face 284, and a convex face 288. The planar face 284 engages a foundation, skid, or the like. The convex face 288 engages a concave face 218 of the bottom member 210 and allows for lateral adjustment.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An apparatus for supporting an axial load between first and second planes, the apparatus comprising:
    a first member positioning between the first and second planes and having opposite ends, one of the ends having a first surface bearing the axial load of the first plane, the other end having a first spiraling face the first member transferring the axial load at the first surface to a first compressive force at the first spiraling face; and
    a second member positioning between the first and second planes and having opposite ends, one of the ends having a second surface bearing the axial load of the second plane, the other end having a second spiraling face, the second member transferring the axial load at the second surface to a second compressive force at the second spiraling face, the second spiraling face positioning against the first spiraling face of the first member regardless of the first and second compressive forces, the second spiraling face opposing the second compressive force of the second member against the first compressive force of the first member,
    wherein the first and second members are rotatable relative to one another to adjust an axial dimension of the apparatus, and
    wherein the first and second compressive forces opposed between the first and second spiraling faces support the axial load between the first and second planes.

2. The apparatus of claim 1, wherein the spiraling surfaces of the first and second members comprise a plurality of steps.

3. The apparatus of claim 1, wherein the first surface comprises a planar surface positioning against the first plane.

4. The apparatus of claim 1, further comprising means for maintaining the first and second members at a point of rotational alignment.

5. The apparatus of claim 1, further comprising means for limiting the first and second members from rotating beyond a point of rotational alignment.

6. The apparatus of claim 1, wherein each of the first and second members defines an axial bore therethrough for passage of an anchor bolt.

7. An apparatus for supporting an axial load between first and second planes, the apparatus comprising:
    a first member positioning between the first and second planes and having opposite ends, one of the ends having a first spherical face, the other end having a first spiraling face, the first member transferring the axial load at the first spherical face to a first compressive force at the first spiraling face; and
    a second member positioning between the first and second planes and having opposite ends, one of the ends having a first surface bearing the axial load of the second plane, the other end having a second spiraling face, the second member transferring the axial load at the first surface to a second compressive force at the second spiraling face, the second spiraling face positioning against the first spiraling face of the first member regardless of the first and second compressive forces, the second spiraling face opposing the second compressive force of the second member against the first compressive force of the first member,
    a third member positioning between the first and second planes and having opposite ends, one of the ends bearing the axial load of the first plane, the other end having a second spherical face positioning against the first spherical face of the first member,
    wherein the first and second members are rotatable relative to one another to adjust an axial dimension of the apparatus, and
    wherein the first and second compressive forces opposed between the first and second spiraling faces support the axial load between the first and second planes.

8. The apparatus of claim 7, wherein the spherical faces of the second and third members maintain substantial contact for transferring the axial load between the first and second planes whether the planes are parallel or non-parallel.

9. The apparatus of claim 7, wherein the spiraling faces of the first and second members define a plurality of steps.

10. The apparatus of claim 7, wherein:
    the second surface of the second member bearing the axial load of the second plane has a third spherical face, and
    the apparatus further comprises a fourth member positioning between the first and second planes and having opposite ends, one of the ends bearing the axial load of the second plane, the other end having a fourth spherical face positioning against the third spherical face of the second member.

11. The apparatus of claim 7, wherein the second member has a central portion extending beyond the second spiraling face, and wherein the first member defines a central bore in which the central portion positions when the spiraling faces of the first and second members are positioned against one another.

12. The apparatus of claim 11, further comprising a locking fastener threading into a side of the first member and engageable with the central portion of the second member to prevent rotation of the first and second members relative to one another.

13. The apparatus of claim 7, further comprising means for maintaining the first and second members at a point of rotational alignment.

14. The apparatus of claim 7, further comprising a plurality of serrations defined on the spiraling faces of the first and second members to maintain rotational alignment between the first and second members.

15. The apparatus of claim 7, further comprising a dowel pin or cap screw positioning axially through one of the first or second members and having a distal end positioning axially through a portion of the other member to maintain rotational alignment between the first and second members.

16. The apparatus of claim 7, further comprising means for limiting the first and second members from rotation beyond a point of rotational alignment.

17. The apparatus of claim 7, further comprising a cap screw threading transversely through one of the first or second members and having a distal end engaging the other member to limit rotation between the first and second members.

18. The apparatus of claim 7, further comprising a pin positioned in the spiraling face of one of the first or second members and engageable in a slot defined in the spiraling face of the other member to limit rotation between the first and second members.

19. A support apparatus, comprising:
a disk having first and second sides and defining an opening therethrough, the first side having a first spherical face, the second side having a first surface bearing axial load from a first direction;
a first mount defining a first bore through a first axis, one end of the first mount having a second spherical face positionable against the first spherical face of the disk, an opposite end of the first mount having a first annular surface encircling the first axis at a first incline, the opposite end having a distal extension extending beyond the first annular surface, a first continuous expanse of the first mount between the second spherical surface and the first annular surface directly transferring the axial load at the second spherical surface to a first compressive force at the first annular surface; and
a second mount having a second bore through a second axis, the second bore receiving at least a portion of the distal extension of the first mount therein, one end of the second mount having a second annular surface encircling the second axis at a second incline, an opposite end of the second mount having a second surface bearing axial load from a second direction opposite to the first direction, a second continuous expanse of the second mount between the second surface and the second annular surface directly transferring the axial load at the second surface to a second compressive force at the first annular surface, the second annular surface positionable against the first annular surface regardless of the first and second compressive forces, the second annular face opposing the second compressive force of the second mount against the first compressive force of the first mount,
wherein an axial dimension between the first and second mounts is defined by orientation of the first annular surface mating with the second annular surface, and
wherein the first and second compressive forces opposed between the first and second annular surfaces support the axial load between the first and second planes.

20. The apparatus of claim 19, wherein the first and second annular surfaces each define a plurality of inclined steps.

21. The apparatus of claim 19, further comprising at least one locking fastener threading into a side of the second mount, the locking fastener engageable with the distal extension of the second mount and preventing rotation of the first and second mounts relative to one another.

22. The apparatus of claim 19, wherein the first and second inclines define a same angle.

23. The apparatus of claim 19, wherein each of the disk, the first mount, and the second mount defines an axial slit along a side.

* * * * *